(12) United States Patent
Kawaguchi et al.

(10) Patent No.: US 11,265,429 B2
(45) Date of Patent: Mar. 1, 2022

(54) STORAGE MEDIUM STORING APPLICATION PROGRAM, INFORMATION PROCESSING APPARATUS, AND METHOD OF CREATING WORKFLOW

(71) Applicant: BROTHER KOGYO KABUSHIKI KAISHA, Nagoya (JP)

(72) Inventors: Masafumi Kawaguchi, Nagoya (JP); Norihiko Asai, Tajimi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/861,348

(22) Filed: Apr. 29, 2020

(65) Prior Publication Data

US 2020/0374408 A1 Nov. 26, 2020

(30) Foreign Application Priority Data

May 24, 2019 (JP) .............................. JP2019-097632

(51) Int. Cl.
*H04N 1/00* (2006.01)
*H04N 1/32* (2006.01)
*G06F 3/12* (2006.01)
*G06K 15/02* (2006.01)

(52) U.S. Cl.
CPC ....... *H04N 1/00395* (2013.01); *H04N 1/0048* (2013.01); *H04N 1/00437* (2013.01); *H04N 1/00482* (2013.01); *H04N 1/32529* (2013.01); *H04N 1/32545* (2013.01)

(58) Field of Classification Search
None
See application file for complete search history.

(56) References Cited

U.S. PATENT DOCUMENTS

2005/0180791 A1* 8/2005 Kujirai ................. G06F 3/1226
400/61
2005/0190395 A1* 9/2005 Aritomi ................ G06F 3/1285
358/1.13

(Continued)

FOREIGN PATENT DOCUMENTS

JP 2017-117195 A 6/2017

*Primary Examiner* — Beniyam Menberu
(74) *Attorney, Agent, or Firm* — Scully, Scott, Murphy & Presser, PC

(57) ABSTRACT

A non-transitory computer-readable storage medium stores an application program for creating a workflow including processing for at least one image data. The application program includes instructions readable by a computer of an information processing apparatus. The instructions, when executed by the computer, cause the information processing apparatus to: perform a search for devices connected to the information processing apparatus; receive a setting of processing of a workflow through an operation interface of the information processing apparatus; perform extraction of, from among the devices found by the search, devices capable of performing the processing of the workflow with the received setting; receive, through the operation interface, selection of a device to perform the processing of the workflow from among the devices extracted by the extraction; and create the workflow including the selected device and the received setting of the processing of the workflow.

18 Claims, 9 Drawing Sheets

(56) References Cited

U.S. PATENT DOCUMENTS

| | | | | |
|---|---|---|---|---|
| 2005/0243365 A1* | 11/2005 | Noda | .................... | G06F 3/1288 |
| | | | | 358/1.15 |
| 2006/0178924 A1* | 8/2006 | Yagiura | ................ | H04L 67/125 |
| | | | | 705/7.12 |
| 2008/0127183 A1* | 5/2008 | Emerson | ............... | G06F 9/5038 |
| | | | | 718/100 |
| 2008/0130047 A1* | 6/2008 | Shudo | ................ | H04N 1/00222 |
| | | | | 358/1.15 |
| 2008/0155568 A1* | 6/2008 | Wakana | ............... | G06F 3/1226 |
| | | | | 719/321 |
| 2008/0250430 A1* | 10/2008 | Salgado | ............... | G06F 3/1204 |
| | | | | 719/327 |
| 2008/0259390 A1* | 10/2008 | Murase | ................ | G06F 3/1205 |
| | | | | 358/1.15 |
| 2009/0282417 A1* | 11/2009 | Yoshida | ............ | H04N 1/00954 |
| | | | | 718/104 |
| 2011/0154136 A1* | 6/2011 | Osuki | ................... | H04L 67/125 |
| | | | | 714/57 |
| 2014/0218763 A1* | 8/2014 | Takahashi | ............. | G06F 3/1288 |
| | | | | 358/1.15 |
| 2015/0154482 A1* | 6/2015 | Kawai | ................... | G06F 3/1204 |
| | | | | 358/1.15 |
| 2017/0185356 A1* | 6/2017 | Kawaguchi | ........ | H04N 1/00949 |

* cited by examiner

| 511 | 512 | 513 | 514 | 515 | 516 | 517 | 518 | 519 |
|---|---|---|---|---|---|---|---|---|
| DEVICE NAME | MODEL NAME | DEVICE ID | COLOR/ MONOCHROMATIC PRINTING | PAPER SIZE | TWO-SIDED PRINTING | CLOUD | FAX | SCAN |
| DEVICE A | model1 | aaa | COLOR MONOCHROMATIC | A4 | SUPPORTED | SUPPORTED | NOT SUPPORTED | NOT SUPPORTED |
| DEVICE B | model2 | bbb | COLOR MONOCHROMATIC | A3 A4 | NOT SUPPORTED | NOT SUPPORTED | NOT SUPPORTED | NOT SUPPORTED |
| DEVICE C | model3 | ccc | COLOR MONOCHROMATIC | A3 A4 B4 B5 | SUPPORTED | SUPPORTED | NOT SUPPORTED | SUPPORTED |

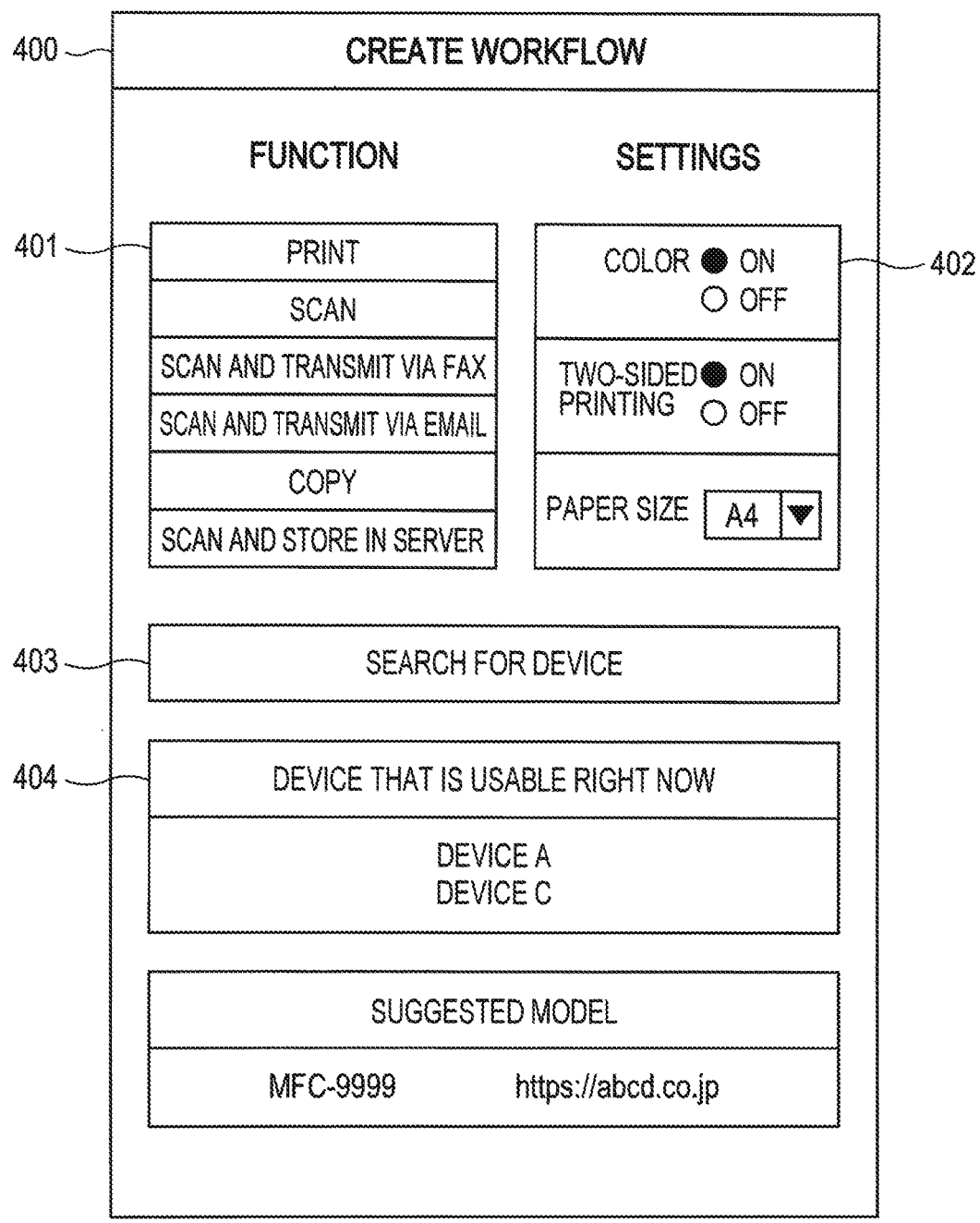

STORAGE MEDIUM STORING APPLICATION PROGRAM, INFORMATION PROCESSING APPARATUS, AND METHOD OF CREATING WORKFLOW

CROSS REFERENCE TO RELATED APPLICATIONS

This application claims priority from Japanese Patent Application No. 2019-097632 filed May 24, 2019. The entire content of the priority application is incorporated herein by reference.

TECHNICAL FIELD

This disclosure relates to an application program that is executable by a computer of an information processing apparatus.

BACKGROUND

Conventionally, an application program is known that creates a workflow that is data indicative of processing on at least one image data. It is disclosed that, when a workflow is created, a device is preliminarily selected and thereafter for each processing in the workflow, a setting suitable for the capability of the selected device is performed.

SUMMARY

According to one aspect, this specification discloses a non-transitory computer-readable storage medium storing an application program for creating a workflow including processing for at least one image data. The application program includes instructions readable by a computer of an information processing apparatus. The instructions, when executed by the computer, cause the information processing apparatus to: perform a search for devices connected to the information processing apparatus; receive a setting of processing of a workflow through an operation interface of the information processing apparatus; perform extraction of, from among the devices found by the search, devices capable of performing the processing of the workflow with the received setting; receive, through the operation interface, selection of a device to perform the processing of the workflow from among the devices extracted by the extraction; and create the workflow including the selected device and the received setting of the processing of the workflow.

According to another aspect, this specification also discloses an information processing apparatus. The information processing apparatus includes a communication interface, an operation interface, a controller, and a memory. The memory stores an application program for creating a workflow including processing for at least one image data. The application program includes instructions readable by the controller. The instructions, when executed by the controller, cause the information processing apparatus to: perform a search for devices connected to the information processing apparatus through the communication interface; receive a setting of processing of a workflow through the operation interface; perform extraction of, from among the devices found by the search, devices capable of performing the processing of the workflow with the received setting; receive, through the operation interface, selection of a device to perform the processing of the workflow from among the devices extracted by the extraction; and create the workflow including the selected device and the received setting of the processing of the workflow.

According to still another aspect, this specification also discloses a method of creating a workflow on an information processing apparatus. The workflow includes processing for at least one image data. The method includes: performing a search for devices connected to the information processing apparatus; receiving a setting of processing of a workflow through an operation interface of the information processing apparatus; performing extraction of, from among the devices found by the search, devices capable of performing the processing of the workflow with the received setting; receiving, through the operation interface, selection of a device to perform the processing of the workflow from among the devices extracted by the extraction; and creating the workflow including the selected device and the received setting of the processing of the workflow.

A control method for realizing the above-described functions, a computer program, and a computer-readable storage medium storing the computer program are also novel and useful.

BRIEF DESCRIPTION OF THE DRAWINGS

Embodiments in accordance with this disclosure will be described in detail with reference to the following figures wherein:

FIG. 2 is an explanatory drawing showing an example of a device table;

FIG. 10 is an explanatory drawing showing an example of a workflow creation screen.

DETAILED DESCRIPTION

As described above, in a procedure in which a device is selected and then a setting is made within a range of the capability of the device, making an inappropriate setting is prevented in the device. However, a user cannot make a desired setting. For example, when it is desired to perform color scan, if a scanner that does not support color scan is preliminarily selected, the setting of color scan cannot be made, and a user is confused. When the setting of color scan is made in such situation, the creation of a workflow needs to be performed again from the selection of the device, and thus the user takes time and effort.

This specification discloses an application program configured to create a workflow and to enhance convenience when creating the workflow.

An embodiment embodying a system for creating a workflow will be described in detail with reference to accompanying drawings. This embodiment discloses an application program that is executed in a personal computer (hereinafter referred to as the "PC"), that is, an application program (hereinafter referred to as the "application") that receives the settings of each processing in the workflow and the selection of a device that executes each processing in the workflow.

Figure 1:
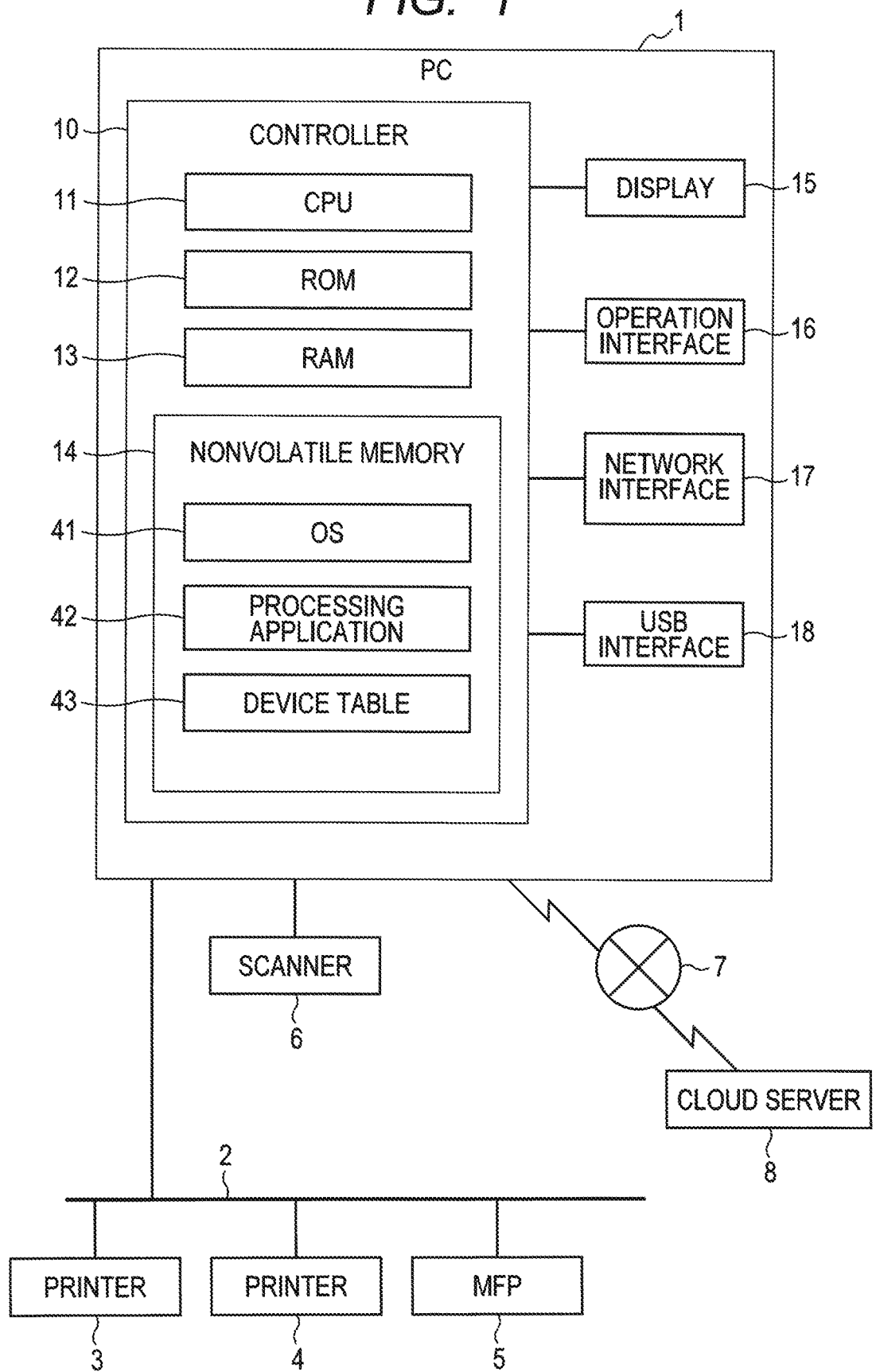
FIG. 1 is a block diagram showing the electrical configuration of a system according to an embodiment.

As shown in FIG. 1, in the system of this embodiment, the PC 1 is connected to a printer 3, a printer 4, a multifunction peripheral (hereinafter referred to as the "MFP") 5, a scanner, 6 and a cloud server 8 so as to communicate therewith. The PC 1, the printer 3, the printer 4, and the multifunction peripheral 5 are connected through a network 2 so as to communicate with each other. The network 2 may be a wired network or a wireless network, or a plurality of communication methods may be mixed in the network 2. The PC 1 and the scanner 6 are connected together through a USB so as to communicate with each other. The PC 1 and the cloud server 8 are connected through the Internet 7 so as to communicate with each other. The PC 1 is an example of an "information processing apparatus." The printer 3, the printer 4, the MFP 5, and the scanner 6 are examples of the "device."

The PC 1 will be described. The PC 1 is an apparatus that executes various types of programs. The PC 1 of this embodiment has the function of inputting image data transmitted from the MFP 5, the scanner 6, or the cloud server 8, the function of outputting image data to the printer 3, the printer 4, the MFP 5, or the cloud server 8 and the function of processing the workflow. The PC 1 may be, for example, a tablet computer or a smartphone.

As shown in FIG. 1, the PC 1 of this embodiment includes a controller 10 including a CPU 11, a ROM 12, a RAM 13, and a nonvolatile memory 14. The PC 1 further includes a display 15, an operation interface 16, a network interface (hereinafter referred to as the "network IF") 17, and a USB interface (hereinafter referred to as the "USB IF") 18, and these are electrically connected to the controller 10. The CPU 11 is an example of a "computer." The display 15 is an example of a "display device". The operation interface 16 is an example of an "input device."

The ROM 12 stores a start-up program for starting up the PC 1, and so on. The RAM 13 is used either as a work area when various types of processing are executed or as a storage area in which data is temporarily stored. The nonvolatile memory 14 is, for example, an HDD or a flash memory, and is used as a region in which various types of programs including a processing application 42, various types of data such as the image data, the workflow and device information, various types of settings, and so on are stored. The details of the workflow and the processing application 42 will be described later.

The CPU 11 executes various types of processing according to the programs read from the ROM 12 and the nonvolatile memory 14 or based on the operation of the user. The controller 10 in FIG. 1 is a generic name for collectively referring to hardware and software used in the control of the PC 1 and does not necessarily refer to a single hardware that is actually present in the PC 1.

The display 15 includes hardware that displays information. The operation interface 16 is, for example, a keyboard or a mouse, and includes hardware that receives the operation of the user. Instead of a combination of the display 15 and the operation interface 16, the PC 1 may include a touch panel that has both an input function and an output function.

The network IF 17 includes hardware that communicates with an external apparatus such as the cloud server 8 through the Internet 7. The network IF 17 also includes hardware for communicating with the external apparatus through the network 2. The PC 1 may include a plurality of network IFs 17 for different communication methods. The USB IF 18 includes hardware for communicating with the scanner 6. The communication with the scanner 6 may be communication through the network IF 17.

The nonvolatile memory 14 of the PC 1 stores various types of programs including an operating system (hereinafter referred to as the "OS") 41 and the processing application 42. The nonvolatile memory 14 also stores various types of data including a device table 43. Part of the OS 41 may be included in the ROM 12. The processing application 42 is a program that executes various types of processing in the workflow. The processing application 42 may be either a program having only the function of registering and executing the workflow, or may be a program having the function of registering and executing the workflow as well as the function of executing image processing, a printing instruction, and so on. The processing application 42 is an example of the "application program". The processing application 42 will be described later.

The device table 43 is stored in a storage region for the processing application 42 within the nonvolatile memory 14. The processing application 42 searches for devices that are connected to the PC 1, and stores, as a device record, the information of a found device in the device table 43. The timing to search for devices may be when the processing application 42 is installed onto the PC 1 or when the OS 41 detects that a new device is connected to the PC 1. For example, the PC 1 may provide, in a screen for executing and displaying the processing application 42, a device search icon for searching for devices so as to search for the devices at the timing of when the device search icon is pressed.

As shown in FIG. 2, the device table 43 includes, for example, information of a device name 511, a model name 512, a device ID 513, color/monochromatic printing 514, a paper size 515, two-sided printing 516, a cloud 517, FAX 518, and scan 519.

The device name 511 is information for identifying the device. The model name 512 is the model name of the device. The device ID 513 is information for identifying the device, and may be a MAC address, a network address, and so on. In a case where color printing is possible, "color" and "monochromatic" are stored in the color/monochromatic printing 514, whereas in a case where color printing is not possible, only "monochromatic" is stored therein. The paper size 515 stores the size of paper that can be printed. In a case where each of the two-sided printing 516, the cloud 517, the FAX 518, and the scan 519 is possible, "supported" is stored, whereas when they are not possible, "not supported" is stored.

The workflow will be described next. The workflow of this embodiment is data indicating processing on at least one image data. For example, the workflow is data in which the function and the setting of one or a plurality of processing to be executed on at least one image data are preliminarily registered (stored) in a particular storage region. The workflow is read out from the particular storage region according to the operation of a shortcut icon and so on, in order to execute predetermined processing.

The processing of a workflow includes, for example, at least input processing for inputting image data or output processing for outputting image data. In other words, the processing of a workflow includes processing obtained by combination of the input processing and the output processing. The input processing includes, for example, the reading of an image or the downloading of image data stored in the cloud server. The output processing includes, for example, the printing of an image, the uploading of image data to the cloud server, the transmission of image data by facsimile (referred to as "FAX"), or the transmission of image data by electronic mail (referred to as "Email"). For example, in a case where image data scanned with the scanner is transmitted via Email, one workflow includes parameters that are set preliminarily for each of two processing of scan and Email transmission. For example, in a case where image data scanned with the scanner is transmitted to a particular destination by FAX, one workflow includes parameters that are set preliminarily for each of two processing of scan and FAX transmission of the image data. For example, in a case where an image is scanned with the scanner, one workflow includes parameters that are set preliminarily for one processing of scan. The processing of a workflow may include only input processing of inputting image data. Alternatively, the processing of a workflow may include only output processing of outputting image data. Alternatively, the processing of a workflow may include both input processing of inputting image data and output processing of outputting image data.

The processing of a workflow includes processing in which a plurality of processing (a plurality of operations) is combined and in which a plurality of processing is executed in an order. For example, in a case where image data is read with the scanner, image conversion is performed on the read image data, and the image data after the conversion is transmitted, one workflow includes the setting of parameters for each processing and also includes the order of the scan, the image conversion, and the data transmission. For example, in a case where copying is performed with the MFP, one workflow includes parameters for each of scan and printing and also includes the order of the scan and the printing.

Further, for example, the processing of a workflow includes a case where the result of the execution of one workflow is obtained by a plurality of devices in conjunction with each other. For example, in a case where copying is performed by transmitting image data scanned with the scanner to the printer and by printing the image data, two devices of the scanner and the printer are used to obtain one printed product as a result of the execution of one workflow. In this case, the workflow stores, as one workflow, parameters that are set preliminarily for each processing of the scan and the printing.

The workflow is created by the PC 1 based on an instruction from the user. By executing the processing application 42, the PC 1 receives, through the operation interface 16, the setting of the function of at least the input processing or the output processing, and further receives, through the operation interface 16, the setting of parameters necessary for each function that is set. The PC 1 extracts, from among the devices connected to the PC 1, devices configured to execute processing with the settings in the workflow, and receives, through the operation interface 16, the selection of a device for executing the processing of the workflow from among the extracted devices.

Figure 3:
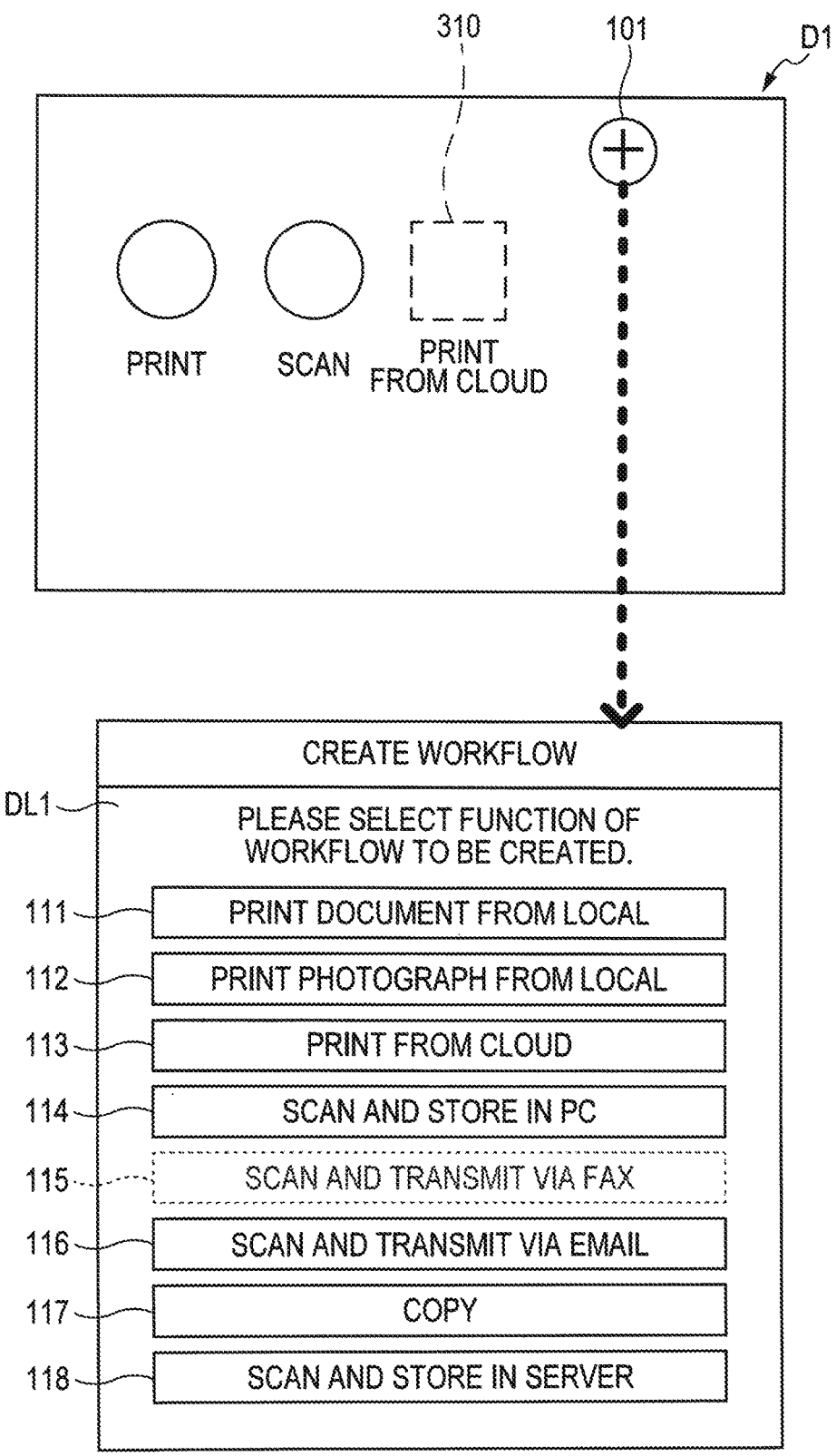
FIG. 3 is an explanatory drawing showing an example of screen transition.

FIG. 3 shows an example of a transition of screens that are displayed on the display 15 when the processing application 42 is executed in the PC 1 and an instruction for creating a workflow is received. When the processing application 42 is executed, the PC 1 displays a top screen D1 on the display 15. On the top screen D1, a workflow creation button 101 is displayed. The workflow creation button 101 is a button for receiving an instruction for creating a workflow.

In response to pressing of the workflow creation button 101, the PC 1 displays a function setting screen DL1 on the display 15. The function setting screen DL1 is a screen for receiving the setting of a function to be executed in the workflow. For example, icons 111 to 118 are displayed on the function setting screen DL1. The icon 111 is an icon for selecting a function of acquiring a document from a local area and printing the document. The icon 112 is an icon for selecting a function of acquiring a photograph from the local area and printing the photograph. The icon 113 is an icon for selecting a function of acquiring image data from the cloud server and printing the image data. The icon 114 is an icon for selecting a function of scanning image data and storing the scanned image data in the PC 1. The icon 115 is an icon for selecting a function of scanning image data and transmitting the scanned image data via FAX. The icon 116 is an icon for selecting a function of scanning image data and transmitting the scanned image data via Email. The icon 117 is an icon for selecting a function of scanning image data and printing the scanned image data (that is, copying). The icon 118 is an icon for selecting a function of scanning image data and storing the scanned image data in the server.

Through selection of one of the icons 111 to 118, the PC 1 receives the settings of both the function to be executed in the input processing and the function to be executed in the output processing. For example, when the icon 113 is selected through the operation interface 16, the PC 1 sets, as the function to be executed in the input processing, the function of acquiring image data from the cloud server, and sets, as the function to be executed in the output processing, the function of printing the image data acquired in the input processing. The function setting screen DL1 may separately receive the setting of the function to be executed in the input processing and the setting of the function to be executed in the output processing.

Figure 4:
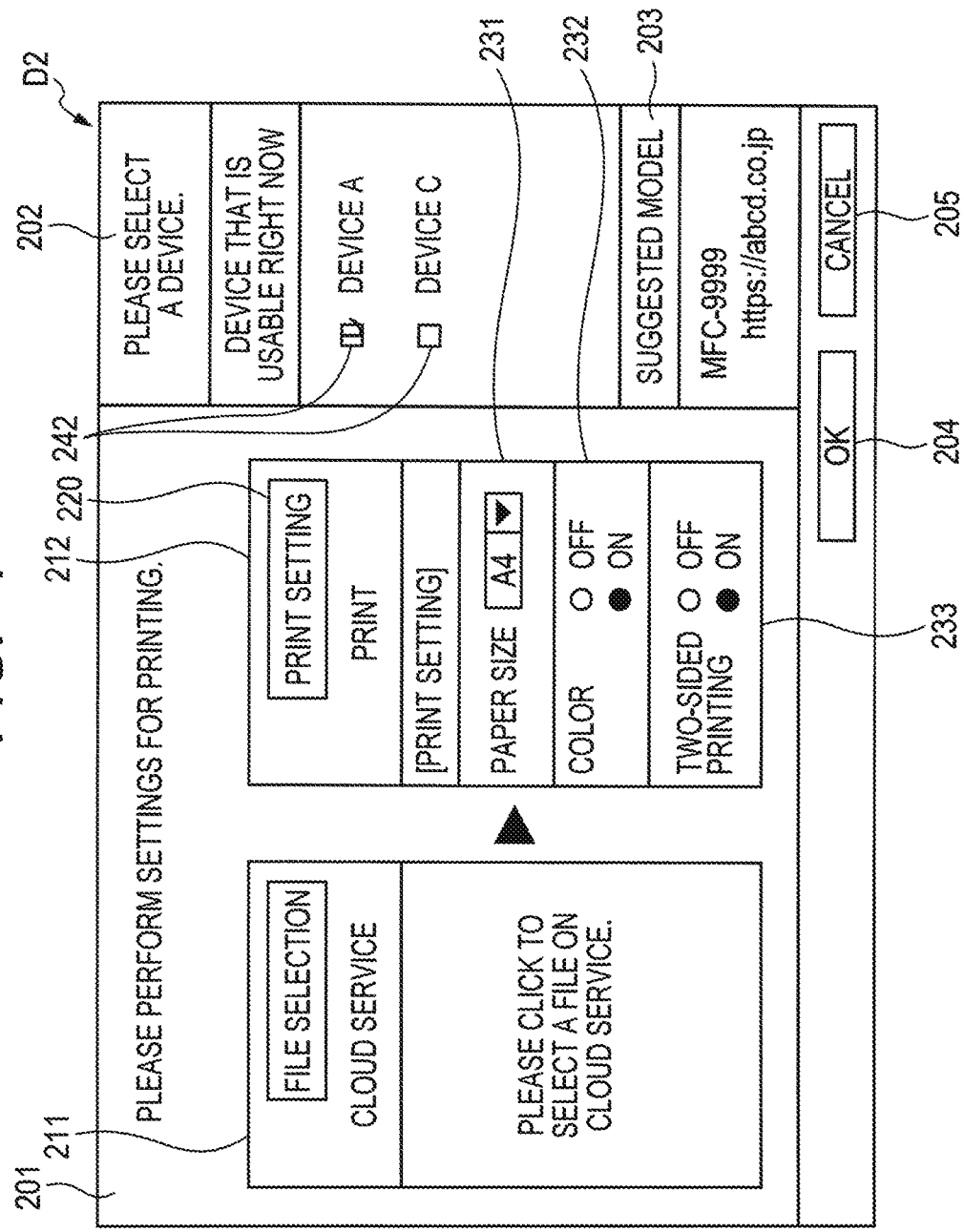
FIG. 4 is an explanatory drawing showing an example of a parameter input screen.

As shown in FIG. 4, for example, when the icon 113 is pressed, the PC 1 uses the display 15 to display a parameter input screen D2 shown in FIG. 4. A parameter input region 201, a device selection region 202, a model suggestion region 203, an OK icon 204, and a cancellation icon 205 are displayed on the parameter input screen D2.

The parameter input region 201 is a region for receiving, through the operation interface 16, the settings of each processing in the workflow on a function-by-function basis. The device selection region 202 is a region for displaying, in a selectable manner, devices capable of executing the processing at the settings inputted in the parameter input region 201 and receiving, through the operation interface 16, the selection of the device to execute the workflow. The OK icon 204 is an icon for receiving an instruction for determining the settings of each processing in the workflow. The cancellation icon 205 is an icon for receiving an instruction for canceling the creation of the workflow.

In the parameter input region 201, an input-side setting portion 211 and an output-side setting portion 212 are provided. The input-side setting portion 211 is a setting region for setting a parameter for the input function to be executed in the input processing. Since on the function setting screen DL1 shown in FIG. 3, the icon 113 is selected, the input processing is processing for acquiring the image data of a document from the cloud. Hence, in the input-side setting portion 211 shown in FIG. 4, the image data that is acquired from the cloud server is identified.

The output-side setting portion 212 is a setting region for setting a parameter for the output function to be executed in the output processing. Since on the function setting screen DL1 shown in FIG. 3, the icon 113 is selected, the output processing is processing for printing the image data acquired from the cloud. Hence, in the output-side setting portion 212 shown in FIG. 4, the setting of print parameters is performed. Specifically, in the output-side setting portion 212, in response to a pressing operation of a print setting icon 220 through the operation interface 16, a paper size setting area 231, a color setting area 232, and a two-sided printing setting area 233 are displayed. The print parameters that are set in the output-side setting portion 212 are not limited to these parameters and may include items such as image quality and multiple-page printing (that is, multiple pages are printed on one sheet).

The device selection region 202 is a region in which devices are displayed as a list. The processing application 42 extracts, from the device table 43, devices capable of executing processing with the parameters inputted in the parameter input region 201, and displays, in a selectable manner, the extracted devices in the device selection region 202 so that each device can be selected.

For example, it is assumed that as in the example shown in FIG. 4, "A4 size" is set in the paper size setting area 231, "ON" is set in the color setting area 232, and "ON" is set in the two-sided printing setting area 233. As shown in FIG. 2, for devices A and C, "color" is stored in the color/monochromatic printing 514, "A4" is stored in the paper size 515, and "supported" is stored in the two-sided printing 516, and thus each of the devices A and C is capable of performing print processing with the print parameters shown in FIG. 4. As shown in FIG. 2, for the device B, "color" is stored in the color/monochromatic printing 514 and "A4" is stored in the paper size, but "not supported" is stored in the two-sided printing 516, and thus the device B is incapable of performing the print processing with the print parameters shown in FIG. 4. Hence, as shown in FIG. 4, a device list in the device selection region 202 includes the devices A and C and does not include the device B.

As shown in FIG. 4, in the device selection region 202, a check box 242 is provided next to each of the devices that are displayed. By checking the check box 242, the device to execute the workflow is selected. Hence, the user can select the device to execute the workflow from among the devices A and C capable of executing the print processing with the desired print parameters set in the output-side setting portion 212. In this way, when the user wishes to create a workflow including two-sided printing, the PC 1 avoids a situation in which the device B is selected and two-sided printing cannot be set.

In this embodiment, the PC 1 displays only the extracted devices in the device selection region 202. Alternatively, all the devices stored in the device table 43 may be displayed in the device selection region 202, in which the extracted devices are displayed so as to be selectable and the devices that are not extracted are displayed in gray, for example, so as not to be selectable.

Figure 5:
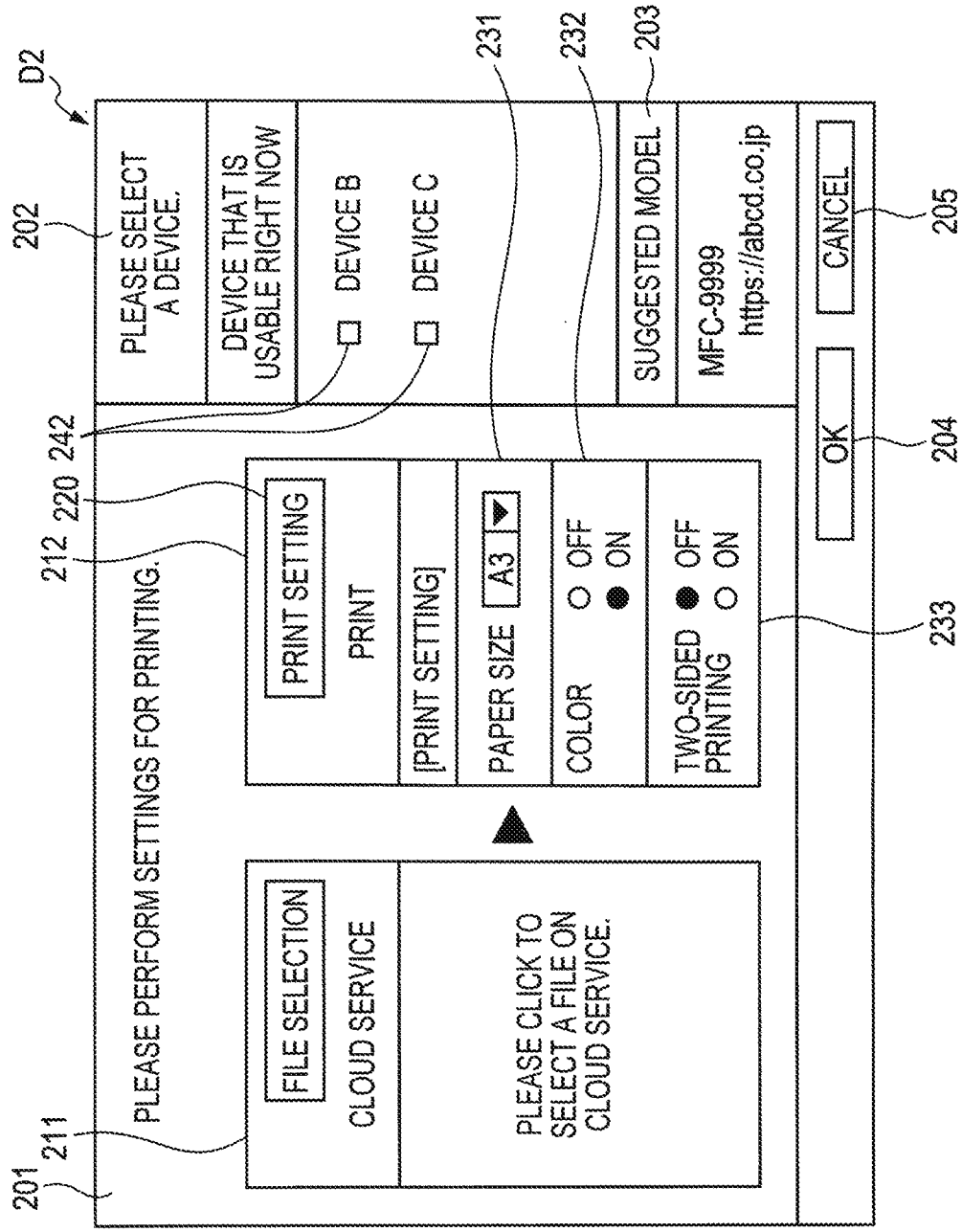
FIG. 5 is an explanatory drawing showing another example of the parameter input screen.

FIG. 5 shows an example of the parameter input screen D2 in a case where parameters different from those in the example shown in FIG. 2 are inputted. As shown in FIG. 5, "A3 size" is set in the paper size setting area 231, "ON" is set in the color setting area 232, and "OFF" is set in the two-sided printing setting area 233, and thus the print parameters of the paper size and the two-sided printing are changed from the state shown in FIG. 4. As shown in FIG. 2, for the devices B and C, "color" is stored in the color/monochromatic printing 514 and "A3" is stored in the paper size 515, and thus each of the devices B and C is capable of executing the print processing with the print parameters shown in FIG. 5. As shown in FIG. 2, for the device A, "A3" is not stored in the paper size 515, and thus the device A is incapable of executing the print processing with the print parameters shown in the example of FIG. 5. Hence, the device selection region 202 is changed from a device list including the devices A and C and not including the device B to a device list including the devices B and C and not including the device A.

As described above, each time a print parameter is changed, the device list in the device selection region 202 is changed. Hence, the user can easily grasp and select devices that support desired print parameters from among the devices connected to the PC 1.

Figure 6:
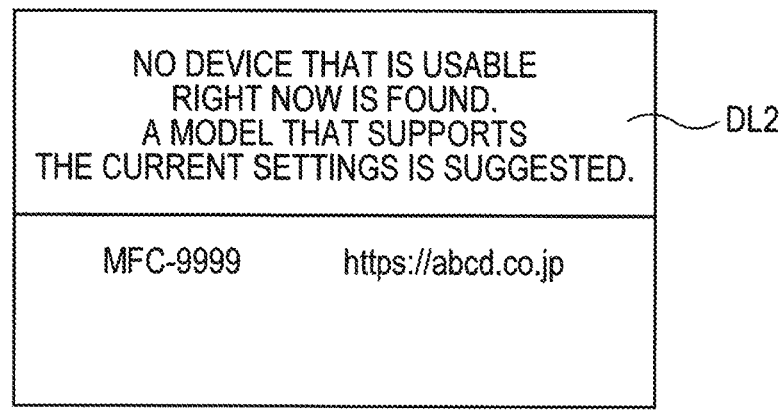
FIG. 6 is an explanatory drawing showing an example of an error message.

In the model suggestion region 203 of the parameter input screen D2, the model name of a device that supports the parameters inputted in the parameter input region 201 and the URL of a purchasing site for purchasing the device are displayed. Alternatively, the model suggestion region 203 may be omitted, and the PC 1 may display an error notification screen DL2 shown in FIG. 6 when no device that support the parameters inputted in the parameter input region 201 is extracted from among the devices connected to the PC 1. The error notification screen DL2 is a dialogue that includes an error message, a model name, and a URL. In this way, the user is less likely to feel inconvenience about the fact that the model name and the URL are displayed every time.

Figure 7:
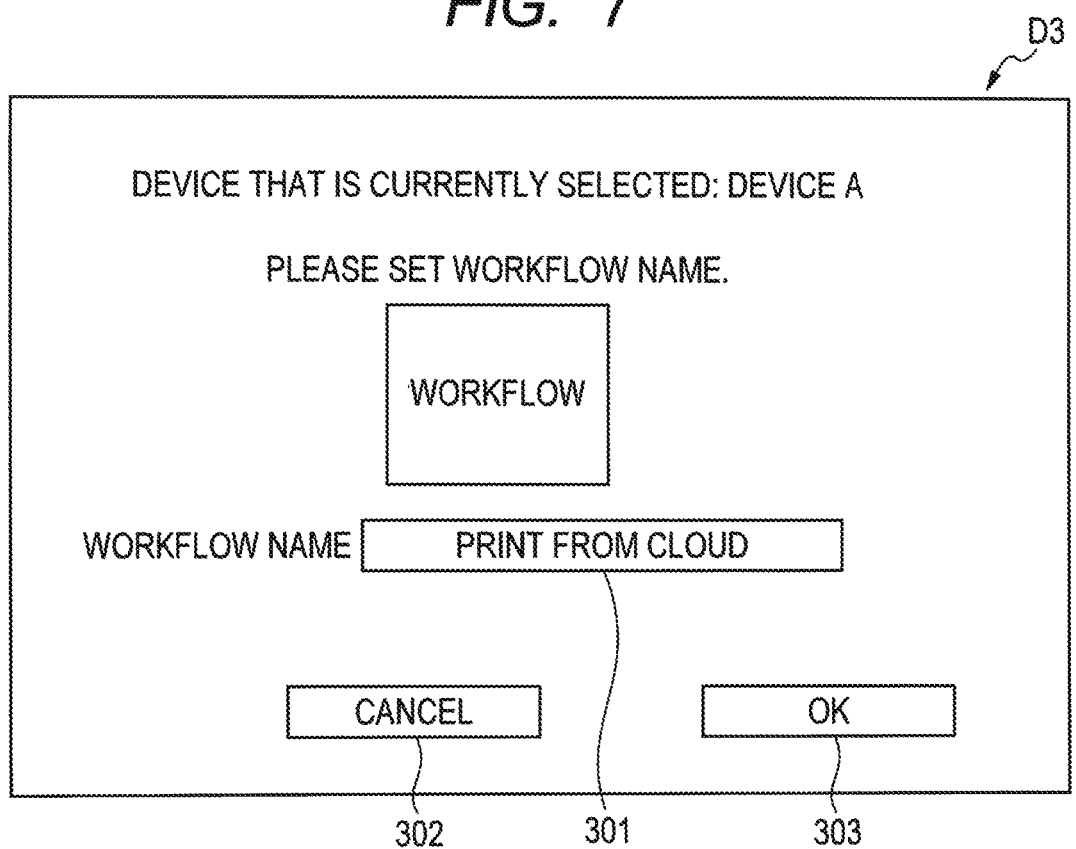
FIG. 7 is an explanatory drawing showing an example of a name setting screen.

For example, as shown in FIG. 4, when the OK icon 204 is pressed in a state where the check box 242 of the device A is checked for selecting the device A, the PC 1 uses the display 15 to display a name setting screen D3 shown in FIG. 7. In the name setting screen D3, a name input area 301, a cancellation icon 302, and an OK icon 303 are displayed. The name input area 301 is an area for receiving the setting of a name for identifying the workflow. The cancellation icon 302 is an icon for receiving the instruction for canceling creation of the workflow. The OK icon 303 is an icon for receiving an instruction for saving the workflow.

When the OK icon 303 is pressed through the operation interface 16 in a state where the name is inputted in the name input area 301, the PC 1 stores, in the nonvolatile memory 14, data including the name inputted in the name setting screen D3, the function received in the function setting screen DL1 shown in FIG. 3, and the parameters received in the parameter input screen D2 shown in FIG. 4 that are associated with one another, as the workflow. Then, as shown in FIG. 3, a shortcut 310 of the saved workflow is displayed in the top screen D1.

When the shortcut 310 is operated through the operation interface 16, the PC 1 reads out the workflow associated with the shortcut 310 from the nonvolatile memory 14, and executes each processing of the workflow. For example, the PC 1 receives image data from the cloud through the network IF 17, and outputs, through the network IF 17 to the device A, the image data having the print parameters of the paper size "A4," the color printing "ON," and the two-sided printing "ON" and causes the device A to perform printing.

Figure 8:
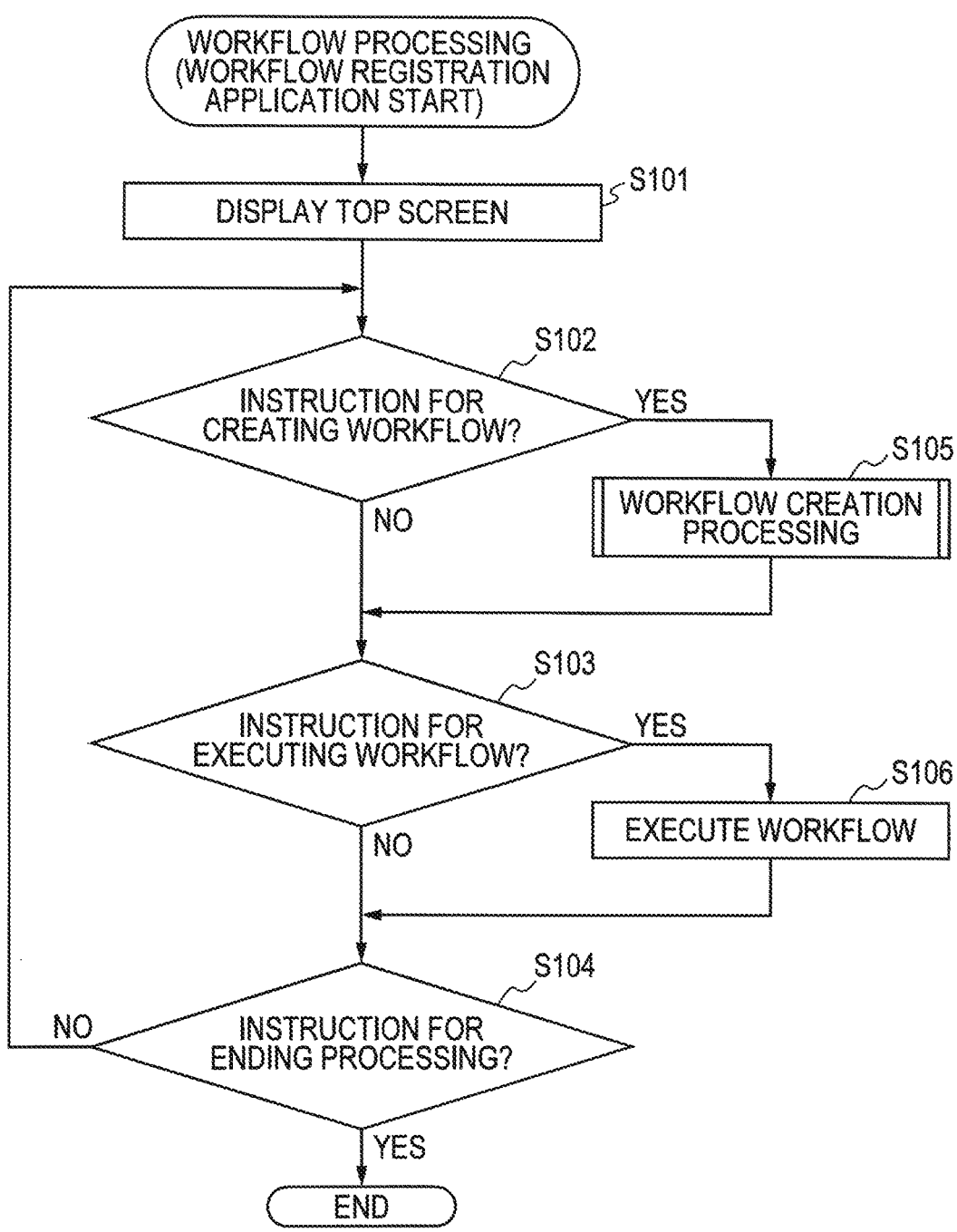
FIG. 8 is a flowchart showing the steps of workflow processing.

Next, the control procedure of the processing application 42 will be described. As shown in FIG. 8, in the PC 1 of this embodiment, in response to receiving an operation of the icon for starting up the processing application 42, the CPU 11 executes the processing application 42 to execute the workflow processing shown in FIG. 8.

The CPU 11 first controls the display 15 to display the top screen D1 as shown in FIG. 3 (S101). The CPU 11 determines whether an instruction for creating a workflow is received (S102). If no operation of the workflow creation button 101 is received through the operation interface 16, the CPU 11 determines that no instruction for creating a workflow is received (S102: NO) and proceeds to S103. If an operation of the workflow creation button 101 is received, the CPU 11 determines that an instruction for creating a workflow is received (S102: YES), executes workflow creation processing (S105), and thereafter proceeds to S103. The workflow creation processing will be described later.

In S103, the CPU 11 determines whether an instruction for executing a workflow is received. If no operation of the shortcut 310 is received through the operation interface 16, the CPU 11 determines that no instruction for executing a workflow is received (S103: NO) and proceeds to S104. If an operation of the shortcut 310 is received through the operation interface 16, the CPU 11 determines that an instruction for executing a workflow is received (S103: YES), executes the workflow (S106), and thereafter proceeds to S104. In other words, the CPU 11 reads out, from the nonvolatile memory 14, the workflow associated with the shortcut 310 and executes the workflow.

In S104, the CPU 11 determines whether an instruction for ending the workflow processing is received. For example, if the top screen D1 is not closed, the CPU 11 determines that no instruction for ending the workflow processing is received (S104: NO) and returns to S102. If the top screen D1 is closed, the CPU 11 determines that an instruction for ending the workflow processing is received (S104: YES) and ends the workflow processing.

The above-mentioned workflow creation processing will be described with reference to FIG. 9. The CPU 11 having received the instruction for creating a workflow determines whether it is timing to search for devices (S201). For example, the timing to search for devices may be the timing when an instruction for creating a workflow is received, or may be the timing when the OS 41 detects a new device, or may be periodical.

In response to determining that it is timing to search for devices (S201: YES), the CPU 11 searches for the devices connected to the PC 1 by using the network IF 17 and the USB IF 18 (S202). The processing in S202 is an example of "search processing". After searching for devices, the CPU 11 stores, in the device table 43, the information of the devices found by the search (S203). In other words, the CPU 11 acquires the names, the model names, and the device IDs of the devices that are found. The CPU 11 also acquires, from the devices, capability information such as whether color printing is possible, the printable paper sizes, whether two-sided printing is possible, whether cloud is possible, whether FAX is possible, and whether scan is possible. The CPU 11 creates, for each device, a device record in which the information acquired from the device is associated, and registers (stores) the device record in the device table 43. Thereafter, the CPU 11 proceeds to S204.

For example, in response to determining that it is not the timing to search for devices (S201: NO), the CPU 11 proceeds to S204 without executing the processing in S202, S203.

In S204, the CPU 11 receives the setting of each processing in the workflow. S204 is an example of "setting processing". The setting of processing in the workflow includes the setting of the function and the setting of the parameters. For example, the CPU 11 displays, on the display 15, the function setting screen DL1 as shown in FIG. 3. Through an operation of one of the icons 111 to 118 through the operation interface 16, the CPU 11 receives the settings of the function of the input processing and the function of the output processing in the workflow. Then, for example, in response to receiving an operation of the icon 113 in the function setting screen DL1, the CPU 11 displays, on the display 15, the parameter input screen D2 as shown in FIG. 4. Then, in response to receiving, through the operation interface 16, input of parameters of the input function and the output function in the parameter input region 201 of the parameter input screen D2, the CPU 11 receives the settings of the inputted parameters.

When displaying the function setting screen DL1 and the parameter input screen D2, the processing application 42 preferably extracts the function and the parameters supported by at least one of the devices that is found in the device search, and displays the function and the parameters in the function setting screen DL1 and the parameter input screen D2. Specifically, for example, as shown in FIG. 2, in a case where none of the devices A to C connected to the PC 1 supports FAX, as shown in FIG. 3, the icon 115 in the function setting screen DL1 relating to FAX may be displayed in gray, so that the icon 115 cannot be selected (that is, in an unselectable manner). In this way, the FAX function that is not supported by the devices A to C connected to the PC 1 is not set as the function of the output processing. Further, in the parameter input screen D2, parameters supported by none of the devices A to C connected to the PC 1 may not be displayed. That is, the parameter input screen D2 may show parameters supported by at least one of the devices A to C, without showing parameters supported by none of the devices A to C. In this modification, the parameters supported by none of the devices A to C connected to the PC 1 are not set.

Alternatively, in S204, the function and the parameters of each processing in a workflow may be selected from among settings that are set preliminarily. For example, the icon 115 may be displayed in a selectable manner, and thus the FAX function may be set as the function of the output processing. In this case, for example, even when the PC 1 is operated off-line and no device supporting the FAX function is found in S202, the workflow having the FAX function as the function of the output processing can be created. With this modification, it is not necessary to extract the function and the parameters supported by the devices connected to the PC 1, and thus the processing becomes simple.

In this embodiment, the settings of the function and the parameters are received by using separate screens which are the function setting screen DL1 and the parameter input screen D2. Alternatively, the settings of the function and the parameters may be received through a single screen.

After receiving the setting of the parameters, the CPU 11 extracts, from the device table 43, devices supporting the parameters inputted in the parameter input region 201 (S205). The processing in S205 is an example of "extraction processing". Then, the CPU 11 determines whether the extraction is successful (S206).

In the example shown in FIG. 4, "A4 size" is set in the paper size setting area 231, "ON" is set in the color setting area 232, and "ON" is set in the two-sided printing setting area 233. Hence, the CPU 11 extracts, from the device table 43, the devices A and C in which "color" is stored in the color/monochromatic printing 514, "A4" is stored in the paper size 515, and "supported" is stored in the two-sided printing 516 (S205). In this case, the CPU 11 determines that the extraction is successful (S206: YES), and the CPU 11 controls the display 15 to display, in the device selection region 202, a device list including the extracted devices A and C and not including the device B (S207). The processing in S207 is an example of "display processing". In other words, the CPU 11 displays only selectable devices based on the settings of the function and the parameters, from among the devices connected to the PC 1. The processing of S207 will be described in greater detail later. After displaying the device list, the CPU 11 proceeds to S208.

As described above, because devices are extracted based on the set function and parameters and are displayed as a list on the display 15, the user can easily select the devices supporting desired function and parameters without giving attention to the capabilities of the devices. In this embodiment, the extracted devices A and C are displayed on the display 15 and the device B is not displayed. Alternatively, for example, all the devices A to C connected to the PC 1 may be displayed on the display 15 in such a manner that the devices A and C are shown by solid characters to be selectable and the device B is shown by gray characters so as not to be selectable.

When displaying the device list, the CPU 11 may display devices based on priorities. For example, a device that is set as a default device in the OS 41 is highly likely to be selected by the user. Hence, when the extracted devices include the default device, the default device may be displayed in preference to the other devices. For example, in a case where the device A is the default device in the OS 41, the device A may be displayed on the top of the device list, and thus the device A is displayed in preference to the device C. In this way, the user can easily select the device A, and thus convenience is enhanced. Alternatively, this prioritized display may be performed by placing a cursor for selection or adding a comment for recommendation.

For example, in a case where the plurality of extracted devices includes a single device capable of executing all the functions and parameters that are set in the workflow, that device may be displayed in the device list in preference to the other devices. For example, it is assumed that, in the function setting screen DL1 of FIG. 3, the icon 117 for copying is operated to set scan as the function of the input processing and to set printing as the function of the output processing in the workflow. In the example of FIG. 2, the device C is capable of executing, by itself, the scan of the input processing and the printing of the output processing. In contrast, for the devices A and B, "not supported" is stored in the scan 519, and thus a separate scanner is needed in order to perform copying. In order to perform copying, there are three options of a first option "device A and device C" (scan by the device C and print by the device A), a second option "device B and device C" (scan by the device C and print by the device B), and a third option "device C" (scan and print by the device C). In this case, the third option "device C" is displayed in preference to the first option "device A and device C" and the second option "device B and device C". This reduces the frequency of realizing a workflow by using a plurality of devices, and reduces time and effort necessary for the user to select a device in each processing in a workflow.

For example, when a plurality of devices is extracted, devices that are used on recent date and time may be displayed preferentially. For example, in a case where the device A is used at the most recent date and time and the device C is used before the device A, the device A is displayed on the top and the device C is displayed second. The device A that is used most recently is highly likely to be the device that is easiest to use by the user. Hence, as described above, by preferentially displaying devices that are used on recent date and time by starting with the device A, the usability of the processing application 42 is enhanced. Note that the usage dates of devices may be managed with the processing application 42. Alternatively, in a case where the usage dates of devices can be acquired from the OS 41, the usage dates may be acquired from the OS 41.

When no device is extracted, the CPU 11 determines that the extraction is not successful (S206: NO), and proceeds to S208' without executing S207.

In S208', the CPU 11 acquires the model name of a device supporting the parameters inputted in the parameter input region 201 (S208'), and controls the display 15 to display the acquired model name in the model suggestion region 203 (S209'). S208' is an example of "acquisition processing", and S209' is an example of "model display processing". The model name may be acquired from a database included in the processing application 42, or may be acquired by communicating with a server of the manufacturer. By displaying, on the display 15, the model name of a device supporting the settings, the user can easily grasp the model name suitable for the settings. The CPU 11 acquires a URL at which the displayed model can be purchased, and displays the URL in the model suggestion region 203. After executing S209', the CPU 11 proceeds to S214 described later.

When at least one device is extracted, the CPU 11 determines that the extraction is successful (S206: YES), and proceeds to S207. The processing of S207 will be described in detail later. After executing S207, the CPU 11 executes S208 and S209. The processing of S208 and S209 are the same as S208' and S209', respectively.

The CPU 11 receives the selection of a device to execute the workflow (S210).

S210 is an example of "selection processing". Specifically, the CPU 11 receives, through the operation interface 16, the device of which the check box 242 is checked, as the device to execute the workflow. The CPU 11 determines whether the OK icon 204 is pressed through the operation interface 16 (S211). In response to determining that the OK icon 204 is not pressed (S211: NO), the CPU 11 determines whether an operation for changing a parameter is received through the operation interface 16 (S214). In response to determining that an operation for changing a parameter is received (S214: YES), the CPU 11 returns to S205 so as to extract devices again. Then, if the extraction is successful (S206: YES), the CPU 11 displays the extracted devices (S207).

For example, as shown in FIGS. 4 and 5, in a case where the setting of the paper size setting area 231 is changed from "A4 size" to "A3 size," and the setting of the two-sided printing setting area 233 is changed from "ON" to "OFF" without changing the setting of the color setting area 232, the CPU 11 determines that an operation for changing parameters is received (S214: YES). In this case, the CPU 11 extracts, from the device table 43 shown in FIG. 2, the devices B and C that satisfy these parameters, and displays the devices B and C on the display 15. In other words, the CPU 11 switches the display of the device selection region 202 from the state where the devices A and C are displayed as a list to the state where the devices B and C are displayed as a list. In this way, each time a parameter is changed, the display of the list of devices is changed. Thus, the user can easily grasp the devices capable of executing the processing with the set parameters. Further, by adding the setting of a parameter, the devices displayed in the device selection region 202 are narrowed (that is, the number of the devices displayed in the device selection region 202 is reduced). Thus, the user can recognize a device suitable for executing the desired function and parameters without giving attention to the capabilities of the devices.

In response to determining that no operation for changing a parameter is received (S214: NO), the CPU 11 determines whether a cancellation operation is received (S215). In response to receiving an operation of the cancellation icon 205 through the operation interface 16 (S215: YES), the CPU 11 ends the workflow creation processing and returns to the processing of FIG. 3. In response to receiving no operation of the cancellation icon 205 through the operation interface 16 (S215: NO), the CPU 11 returns to S211 and determines whether the OK icon 204 is operated.

In response to determining that the OK icon 204 is operated through the operation interface 16 (S211: YES), the CPU 11 receives the setting of the name of the workflow through the operation interface 16 (S212). For example, the CPU 11 controls the display 15 to display the name setting screen D3 shown in FIG. 7. When the OK icon 303 is operated in a state where the name of the workflow is inputted in the name input area 301 through the operation interface 16, the CPU 11 receives the setting of the name. Then, the CPU 11 creates a workflow by associating the settings of the function and the parameters of each processing of the workflow received in S204, the device selected in S210, and the name of the workflow received in S212 with one another, and stores the workflow in a particular region of the nonvolatile memory 14 (S213). The CPU 11 provides, in the top screen D1, the shortcut 310 of the workflow stored in the nonvolatile memory 14. Thereafter, the CPU 11 ends the workflow creation processing.

As described in detail above, before the selection of the device to execute the workflow (S210), the PC 1 of this embodiment executing the processing application 42 receives the settings of the function and the parameters of each processing in the workflow (S204), and extracts devices capable of executing the processing at the settings (S205). Then, the PC 1 allows the user to select the device to execute each processing from among the extracted devices (S210). In this way, the user selects the device supporting the desired settings, thereby suppressing a situation in which the desired settings cannot be made on the PC 1. In other words, this embodiment reduces time and effort that are necessary for the user to select devices again because the device selected as the device for executing the workflow does not support the desired function and settings. Consequently, this embodiment provides the processing application 42 that creates a workflow and enhances convenience when creating the workflow.

While the disclosure has been described in detail with reference to the above aspects thereof, it would be apparent to those skilled in the art that various changes and modifications may be made therein without departing from the scope of the claims.

For example, the device that executes a workflow is not limited to devices such as a printer or an MFP configured to perform print processing, and may be a scanner having the function of reading image data, a facsimile apparatus having the function of transmitting image data by facsimile, or an information processing apparatus having an Email transmission function.

Figure 9:
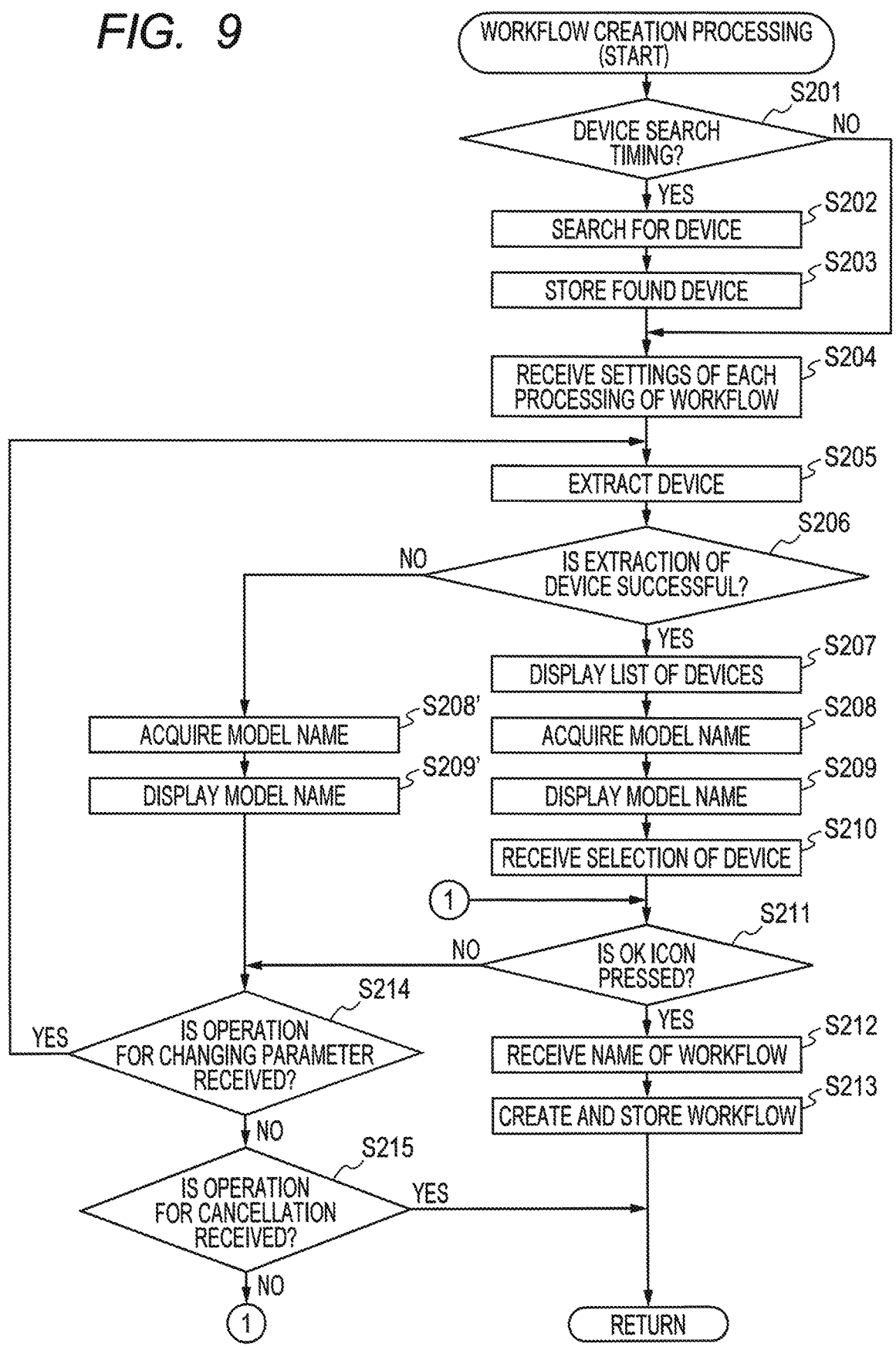
FIG. 9 is a flowchart showing the steps of workflow creation processing.

The device search shown in S202 of FIG. 9 may be performed after the settings of each processing of a workflow are received in S204. For example, in a case where the processing application 42 is installed on a smartphone and an instruction for creating a workflow is received, a workflow creation screen 400 shown in FIG. 10 is displayed on the touch panel of the smartphone. The workflow creation screen 400 includes a function setting area 401, a parameter setting area 402, a device search button 403, and a device selection area 404. When the device search button 403 is tapped in a state where the settings of the function and the parameters are determined, the smartphone searches for devices connected to the smartphone, and among the devices that are searched for, extracts devices capable of executing the processing with the set function and parameters. The operation of the device search button 403 is an example of a "determination operation". In the smartphone, before receiving an operation of the device search button 403, the device selection area 404 is blank, and after receiving the operation of the device search button 403, the extracted devices are displayed in the device selection area 404. According to this modification, after the user determines the settings of each processing of the workflow, the smartphone extracts and displays the devices capable of executing the processing with the settings. Thus, for example, it is not necessary to extract devices and switch the display each time a parameter is changed, and thus the processing becomes simple.

For example, after a device is selected, the function and parameters to be set in the function setting screen DL1 and the parameter input screen D2 may be limited to the function and parameters supported by the selected device. For example, it is assumed that the device A has a specific function that is not provided in the devices B and C. In this case, as shown in FIG. 4, when the device A is selected, the capability of the device A may be reflected on the display of the parameter input region 201. Specifically, setting items not supported by the device A may be omitted, and setting items corresponding to the specific function of the device A may be additionally displayed. According to this modification, the user can make detailed settings for processing using the device A.

The device table 43 may be provided in an external storage such as a network server provided in the network 2. Alternatively, the device table 43 may not be provided in the nonvolatile memory 14, and each time the processing application 42 is executed, a device search may be performed. However, by providing the device table 43, the processing time is reduced.

For example, a list display icon for instructing displaying a list of devices may be provided in the parameter input region 201 shown in FIG. 4, and, in response to receiving an operation of the list display icon, the extracted devices may be displayed as a list in the device selection region 202. In this case, the processing application 42 may execute processing for extracting devices in response to receiving an operation of the list display icon. Alternatively, each time a parameter is changed, the processing application 42 may extract devices, and only when the list display icon is operated, the extracted devices may be displayed as a list in the device selection region 202. In other words, the display of the extracted devices need not be switched each time a parameter is changed. According to this modification, the processing for extracting devices and for switching the display of the devices can be omitted, which simplifies the processing. By changing the display of the devices each time a parameter is changed, the user can select a device at any time, which is convenient. That is, for example, a device to execute a workflow can be selected before settings are made for all the items of the print parameters.

The processing in S208 and S209 of FIG. 9 may be omitted. That is, the processing in S208 (or S208') and S209 (or S209') may be executed when no device is extracted in S205 and thus it is determined that the extraction of devices is not successful (S206: NO). In this modification, when at least one device is extracted in S205 and thus it is determined that the extraction of devices is successful (S206: YES), the processing in S208 and S209 is not executed.

Further, the processing application 42 may have selectable modes including a mode in which a model name is displayed every time, a mode in which a model name is displayed only when no device supporting the settings is extracted, and a mode in which no model name is displayed, so that a model name is displayed according to the preference of a user.

For example, the print setting icon 220 shown in FIG. 4 may be omitted, default values of the print parameters or the most recent parameters may be displayed in the output-side setting portion 212, and parameters may be changed through the operation interface 16.

In any one of the flowcharts disclosed in the embodiment, in an arbitrary manner, the order of execution of a plurality of processing in a plurality of steps may be changed or the plurality of processing may be executed in parallel unless an inconsistency occurs. For example, in FIG. 9, the search processing for searching for devices is executed before executing the setting processing for receiving the settings of each processing of the workflow shown in S204. Alternatively, the search processing may be executed after the setting processing. For example, the processing in S208 and S209 of FIG. 9 may be executed before the processing for extracting devices shown in S205.

The processing disclosed in the above-described embodiment may be executed by hardware such as a single CPU, a plurality of CPUs, and an ASIC or by a combination thereof. Further, the processing disclosed in the above-described embodiment may be realized in various modes such as a storage medium storing a program for executing the processing and a method for executing the processing.

What is claimed is:

1. A non-transitory computer-readable storage medium storing an application program for creating a workflow including processing for at least one image data, the application program including instructions readable by a computer of an information processing apparatus, the instructions, when executed by the computer, causing the information processing apparatus to:
   perform a search for devices connected to the information processing apparatus;
   receive a setting of processing of a workflow through an operation interface of the information processing apparatus;
   perform extraction of, from among the devices found by the search, devices capable of performing the processing of the workflow with the received setting;
   acquire a model name of a device capable of performing the processing with the received setting;
   control a display of the information processing apparatus to display the acquired model name in a case where no device is extracted by the extraction, without displaying the acquired model name in a case where a device is extracted by the extraction;
   receive, through the operation interface, selection of a device to perform the processing of the workflow from among the devices extracted by the extraction; and
   create the workflow including the selected device and the received setting of the processing of the workflow.

2. The non-transitory computer-readable storage medium according to claim 1, wherein the instructions, when executed by the computer, cause the information processing apparatus to:
   perform the search before receiving the setting of the processing of the workflow; and
   receive the setting of the processing of the workflow from among settings supported by at least one of the devices found by the search.

3. The non-transitory computer-readable storage medium according to claim 1, wherein the instructions, when executed by the computer, cause the information processing apparatus to:
   receive the setting of the processing of the workflow from among settings that are set preliminarily.

4. The non-transitory computer-readable storage medium according to claim 1, wherein the instructions, when executed by the computer, cause the information processing apparatus to:
   control the display of the information processing apparatus to display a list of the devices extracted by the extraction.

5. The non-transitory computer-readable storage medium according to claim 4, wherein the instructions, when executed by the computer, cause the information processing apparatus to:
   each time the setting of the processing of the workflow is changed, perform the extraction and display the list of the devices extracted by the extraction.

6. The non-transitory computer-readable storage medium according to claim 4, wherein the instructions, when executed by the computer, cause the information processing apparatus to:
   after receiving the setting of the processing of the workflow, further receive a determination operation of determining the setting of the processing of the workflow; and
   after receiving the determination operation, perform the extraction and display the list of the devices extracted by the extraction.

7. The non-transitory computer-readable storage medium according to claim 4, wherein the instructions, when executed by the computer, cause the information processing apparatus to:
   in a case where the devices extracted by the extraction include a default device registered in an operating system of the information processing apparatus, control the display to display the default device in preference to other devices.

8. The non-transitory computer-readable storage medium according to claim 4, wherein the instructions, when executed by the computer, cause the information processing apparatus to:
   in a case where the workflow includes a plurality of processing and the devices extracted by the extraction include a single device capable of performing all of the plurality of processing of the workflow, control the display to display the single device in preference to other devices.

9. The non-transitory computer-readable storage medium according to claim 4, wherein the instructions, when executed by the computer, cause the information processing apparatus to:
   in a case where a plurality of devices including a first device and a second device are extracted by the extraction, display the first device in preference to the second device, the first device being used at more recent date and time than the second device is.

10. The non-transitory computer-readable storage medium according to claim 1, wherein the workflow includes at least:
    input processing of inputting the image data; or
    output processing of outputting the image data inputted by the input processing.

11. The non-transitory computer-readable storage medium according to claim 10, wherein the workflow includes a combination of the input processing and the output processing.

12. The non-transitory computer-readable storage medium according to claim 10, wherein the input processing includes at least acquiring the image data from a local area, acquiring the image data from a cloud server, or acquiring the image data by performing scan; and
wherein the output processing includes at least storing the image data in a local area, storing the image data in a cloud server, transmitting the image data via facsimile, transmitting the image data via email, or printing the image data on a print medium.

13. The non-transitory computer-readable storage medium according to claim 1, wherein the instructions, when executed by the computer, cause the information processing apparatus to:
control the display of the information processing apparatus to display a function setting screen for receiving a function to be executed in the workflow, the function setting screen showing, in a selectable manner, a function supported by at least one of the devices found by the search, the function setting screen showing, in an unselectable manner, a function supported by none of the devices found by the search.

14. The non-transitory computer-readable storage medium according to claim 1, wherein the instructions, when executed by the computer, cause the information processing apparatus to:
control the display of the information processing apparatus to display a parameter input screen for receiving settings of parameters of the processing of the workflow, the parameter input screen showing a parameter supported by at least one of the devices found by the search, without showing a parameter supported by none of the devices found by the search.

15. A non-transitory computer-readable storage medium storing an application program for creating a workflow including processing for at least one image data, the application program including instructions readable by a computer of an information processing apparatus, the instructions, when executed by the computer, causing the information processing apparatus to:
perform a search for devices connected to the information processing apparatus;
receive a setting of processing of a workflow through an operation interface of the information processing apparatus;
perform extraction of, from among the devices found by the search, devices capable of performing the processing of the workflow with the received setting;
control a display of the information processing apparatus to display the devices extracted by the extraction in a device selection region on the display;
acquire a model name of a device capable of performing the processing with the received setting, the model name being a name of a suggested model which is displayed separately from the devices extracted by the extraction;
control the display of the information processing apparatus to display the acquired model name in a model suggestion region on the display, the model suggestion region being different from the device selection region;
receive, through the operation interface, selection of a device to perform the processing of the workflow from among the devices extracted by the extraction; and
create the workflow including the selected device and the received setting of the processing of the workflow.

16. The non-transitory computer-readable storage medium according to claim 15, wherein the instructions, when executed by the computer, cause the information processing apparatus to:
control the display to display the acquired model name in a case where no device is extracted by the extraction, without displaying the acquired model name in a case where a device is extracted by the extraction.

17. An information processing apparatus comprising:
a communication interface;
an operation interface;
a controller; and
a memory storing an application program for creating a workflow including processing for at least one image data, the application program including instructions readable by the controller, the instructions, when executed by the controller, causing the information processing apparatus to:
perform a search for devices connected to the information processing apparatus through the communication interface;
receive a setting of processing of a workflow through the operation interface;
perform extraction of, from among the devices found by the search, devices capable of performing the processing of the workflow with the received setting;
acquire a model name of a device capable of performing the processing with the received setting;
control a display of the information processing apparatus to display the acquired model name in a case where no device is extracted by the extraction, without displaying the acquired model name in a case where a device is extracted by the extraction;
receive, through the operation interface, selection of a device to perform the processing of the workflow from among the devices extracted by the extraction; and
create the workflow including the selected device and the received setting of the processing of the workflow.

18. A method of creating a workflow on an information processing apparatus, the workflow including processing for at least one image data, the method comprising:
performing a search for devices connected to the information processing apparatus;
receiving a setting of processing of a workflow through an operation interface of the information processing apparatus;
performing extraction of, from among the devices found by the search, devices capable of performing the processing of the workflow with the received setting;
acquiring a model name of a device capable of performing the processing with the received setting;
control a display of the information processing apparatus to display the acquired model name in a case where no device is extracted by the extraction, without displaying the acquired model name in a case where a device is extracted by the extraction;
receiving, through the operation interface, selection of a device to perform the processing of the workflow from among the devices extracted by the extraction; and
creating the workflow including the selected device and the received setting of the processing of the workflow.

* * * * *